United States Patent [19]

Suzuki et al.

[11] 4,394,730
[45] * Jul. 19, 1983

[54] MULTI-PROCESSOR SYSTEM EMPLOYING JOB-SWAPPING BETWEEN DIFFERENT PRIORITY PROCESSORS

[75] Inventors: Seigo Suzuki, Yokohama; Seiji Eguchi, Kawasaki, both of Japan

[73] Assignee: Tokyo Shibaura Denki Kabushiki Kaisha, Japan

[*] Notice: The portion of the term of this patent subsequent to Mar. 2, 1999, has been disclaimed.

[21] Appl. No.: 197,566

[22] Filed: Oct. 16, 1980

Related U.S. Application Data

[63] Continuation-in-part of Ser. No. 120,400, Feb. 11, 1980, abandoned, which is a continuation of Ser. No. 747,347, Dec. 3, 1976, abandoned.

[30] Foreign Application Priority Data

Dec. 4, 1975 [JP] Japan ................. 50-144630

[51] Int. Cl.³ .......................... G06F 9/46; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,312,951 | 4/1967 | Hertz | 364/200 |
| 3,421,150 | 1/1969 | Quosig et al. | 364/200 |
| 3,551,892 | 12/1970 | Driscoll, Jr. | 364/200 |
| 3,566,357 | 2/1971 | Ling | 364/200 |
| 3,648,252 | 3/1972 | Thron et al. | 364/200 |
| 3,774,163 | 11/1973 | Recoqne | 364/200 |
| 3,940,743 | 2/1976 | Fitzgerald | 364/200 |
| 4,001,783 | 1/1977 | Monahan et al. | 364/200 |
| 4,020,471 | 4/1977 | Woods et al. | 364/200 |
| 4,318,174 | 3/1982 | Suzuki et al. | 364/200 |

*Primary Examiner*—Eddie P. Chan
*Attorney, Agent, or Firm*—Finnegan, Henderson, Farabow, Garrett & Dunner

[57] ABSTRACT

A multi-processor system having a priority control wherein jobs are transferred between processors in a multi-processor system when a new job is accepted by the system. The processors are arranged in a predetermined priority sequence and in response to an interrupt command, the system always directs a transferred job to which priority processor whose currently executing job is transferred to a lower priority processor. Jobs are transferred by shifting linkage information from one processor to the other through a common control memory in accordance with a job transfer program at each processor. When the interrupt cycle is completed, transferred jobs are returned to the processor at which they were being processed prior to the interrupt.

3 Claims, 3 Drawing Figures

F I G. 3
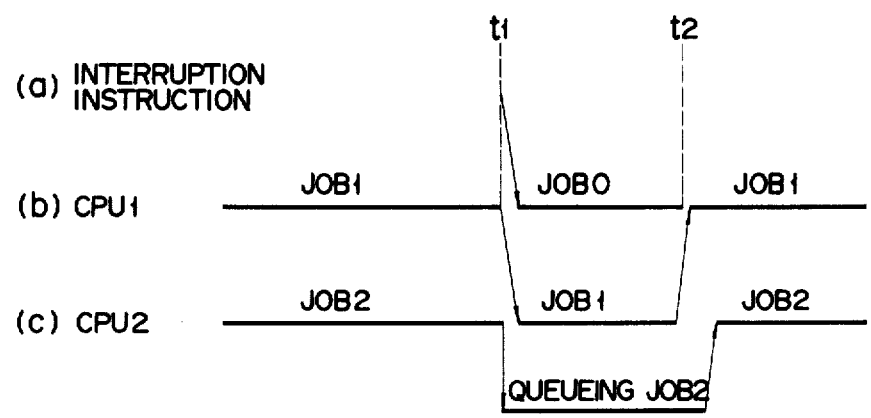

MULTI-PROCESSOR SYSTEM EMPLOYING JOB-SWAPPING BETWEEN DIFFERENT PRIORITY PROCESSORS

PARENT APPLICATION

This application is a continuation-in-part of U.S. application Ser. No. 120,400, now abandoned entitled "A Priority Processing Control System for A Multi-processor System having A Plurality of Processor Units" filed Feb. 11, 1980, which is in turn, a continuation of U.S. application Ser. No. 747,347, now abandoned entitled "A Priority Processing Control System for A Multi-processor System having A Plurality of Processor Units" filed Dec. 3, 1976.

RELATED APPLICATION

This application is related to continuation application Ser. No. 076,844, filed Sept. 19, 1979 in the names of Seigo Suzuki and Seiji Eguchi entitled "Control Method and System for Multi-Processor System" for which the Notice of Allowance was mailed July 14, 1981, now U.S. Pat. No. 4,318,174.

BACKGROUND OF THE INVENTION

This invention relates to a multi-processor system, and more specifically to a multi-processor system capable of exercising smooth job swapping control from a higher priority processor unit to a lower priority processor unit.

The multi-processor system is available for improving system efficiency by employing a plurality of processor units. In parallel processing of programs by the system, each job step of the program to be processed is divided into tasks, and an input-output device is allocated by means of an operating system. In doing this, a dynamic programming method is used, allocating an area of the main memory for each task and controlling the scheduling of input-output operations through a supervisory program. In a multi-processor system, however, when the processor units are subject to interruption of service due to a request for other job services higher in priority while one processor unit is performing a job service, the job service presently in process may be abandoned. There may also be required a job sequence in which where as in the case of time-sharing, the interruption timing is regulated by the operating system, the job in process is stopped for a predetermined time while, job services higher in priority are performed and then the job in question is resumed.

SUMMARY OF THE INVENTION

An object of this invention is to provide a system for controlling the transmission of linkage information between processor units under dynamic conditions.

According to this invention, the multi-processor system comprises a plurality of processor units and a memory shared by the processor units, the memory being allocated to areas according to the processor units and storing linkage information on jobs performed by the individual processor units.

The linkage information obtained through the memory is transmitted between the processor units by prescribed control, thereby facilitating smooth job swapping among the processor units.

BRIEF DESCRIPTION OF THE DRAWING

FIG. 3 is a diagram showing a job transfer relation between two processor units when an interruption instruction is applied to a higher priority processor unit.

DETAILED DESCRIPTION OF THE PREFERRED EMBODIMENT

Figure 1:
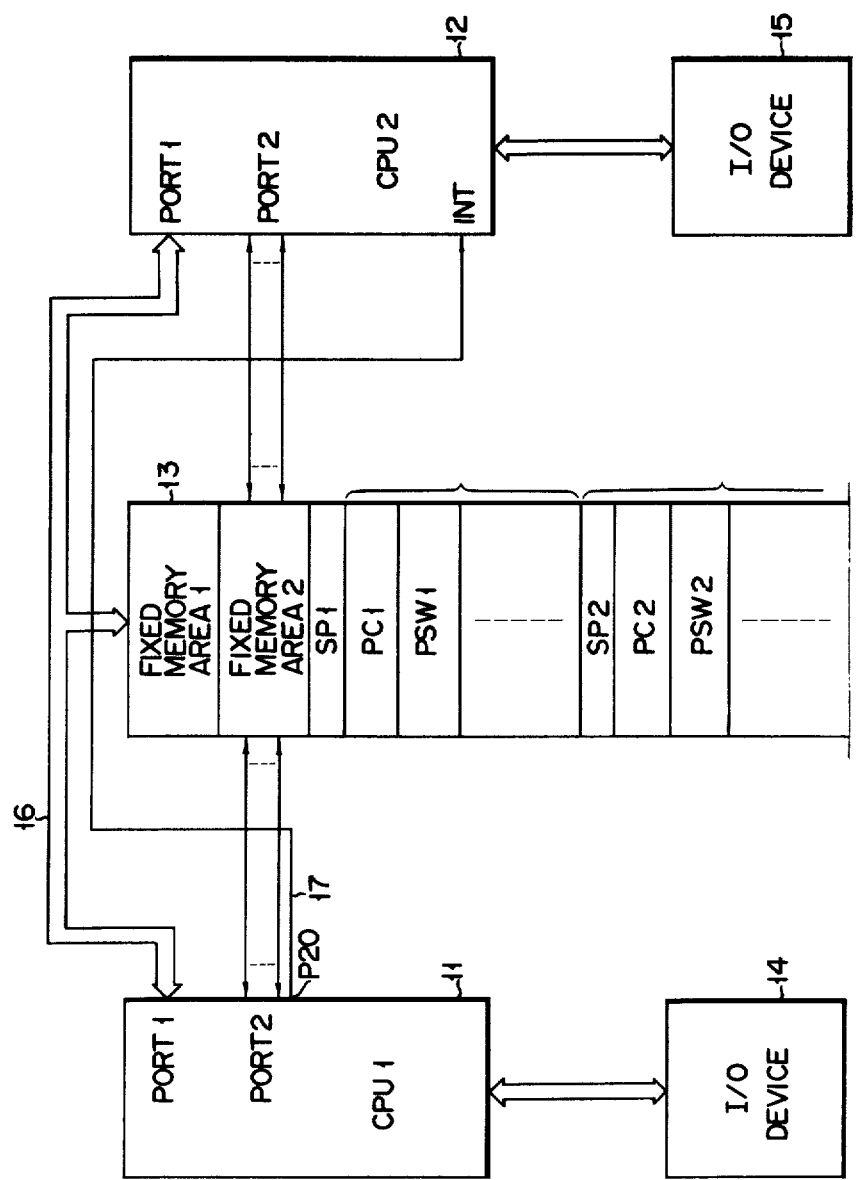
FIG. 1 is a block diagram of the multi-processor unit system of this invention.

In a multi-processor system shown in FIG. 1, each of processor units 11 and 12 uses a processor unit 8048 which is made by Intel Corporation. Ports 1 and 2 of the processor units 11 and 12 are connected to a memory 13. One terminal of the port 2 of the processor unit 11 is connected to an interrupt terminal INT of the processor unit 12 through an interruption line 17. I/O devices 14 and 15 are connected to the processor units 11 and 12, respectively.

Figure 2:
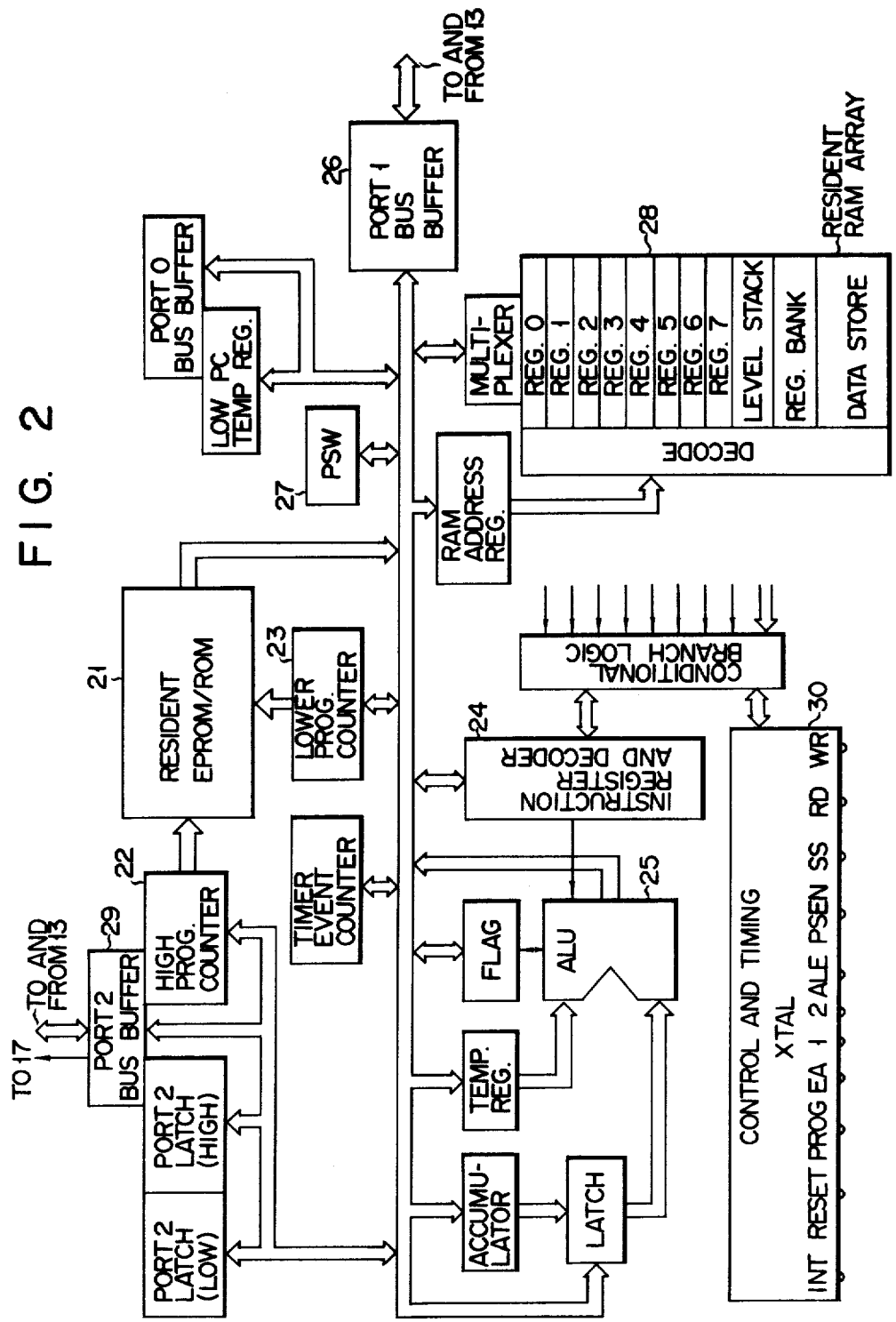
FIG. 2 is a circuit diagram of a processor unit of FIG. 1.

FIG. 2 shows a circuit diagram of the processor unit 11. In this processor unit 11, a resident EPROM/ROM 21 is stored with micro routines for determining the function of the processor unit 11. The EPROM/ROM 21 is subjected to address designation by the contents of a high program counter 22 and low program counter 23, whereby the microinstructions in the EPROM/ROM 21 are read out. These microinstructions are transferred into instruction register and decoder 24 and executed by an arithmetic logic unit (ALU) 25. The processor unit 12 also has the same circuit construction as in FIG. 2.

In the multi-processor system of FIG. 1, the processor units 11 and 12, when in the normally operative condition, respectively execute their own jobs 1 and 2 in accordance with the microinstructions stored in the EPROM/ROM 21 as shown in FIG. 3.

Assume now that at a point of time under this mode of operation, a job 0 which is to be preferentially processed has occurred. Then, an interruption signal is supplied from the I/O device 14 to the processor unit 11. This signal is supplied to the instruction register and decoder 24 through a port 1 bus buffer 26 of the processor unit 11 and is decoded. This interruption is accepted by the processor unit 11 at the time when the existing instruction has been completed.

When the interruption has been accepted, the respective contents of the program counters 22, 23, PSW register 27 and resident RAM array 28, that is, the linkage information, is transferred, in accordance with the instruction, from the EPROM/ROM 21 to the memory 13 through the port 1 bus buffer 26 and a bus 16. The memory, at its fixed memory area 1, is loaded with the contents of the resident RAM array 28, and, at its PC 1 area, the memory is loaded with the contents of the program counters 22 and 23, and at its PSW 1 area, the memory is loaded with the contents of the PSW register 27.

When in this way such linkage information has been stored in the memory 13, an interruption command issues from the resident EPROM/ROM 21 toward the processor unit 12. Namely, this interruption command is transferred to the unit 12 through the port 2 bus buffer 29 and interruption line 17. The unit 12, as mentioned before, has the same circuit construction as that of the processor unit 11.

The interruption command sent to the unit 12 is supplied to a control and timing circuit 30 of FIG. 2 through an interruption terminal INT. When this interruption command has been accepted by the processor unit 12, the respective contents of the program counters 22 and 23, PSW register 27 and resident RAM array 28 in processor 12 are transferred to the memory 13, as in the case of the processor unit 11. At this time, the processor unit 11 executes the job 0 sent thereto in advance from the I/O device 14 as shown in FIG. 3.

The linkage information from the processor unit 12 is stored in the fixed memory area 2, SP 2 area, PC 2 area and PSW 2 area in the same manner as in the case of the unit 11. When the linkage information of the processor unit 12 is stored in the memory 13, a read strobe signal is sent to the memory 13 from the control and timing circuit 30 of the unit 12 through a read terminal RD (FIG. 2, control and timing xtal 30). In response to the read strobe signal, the linkage information corresponding to the processor unit 11 is read out from the fixed memory area 1, SP 1 area, PC 1 area and PSW 1 area and is stored in the program counters 22, 23, PSW register 27 and resident RAM array 28. Accordingly, in the processor unit 12, the job 1 which was previously executed in the processor unit 11 is executed in accordance with the linkage information supplied therefrom (see FIG. 3). In other words, the job 2 which was executed in the unit 12 is stored in the memory 13, and the job 1 which was executed in the unit 11 is transferred to the unit 12 and executed therein. In the unit 11, the job 0 is sent thereto from the I/O device 14 is executed.

When the processing of the preferential job 0 in the unit 11 has been completed, the processed data is transferred to the I/O device 14 through the port 1 bus buffer 26. When transfer of data to the I/O device 14 is completed, an interruption signal is supplied to the unit 12 through the port 2 bus buffer 29 and interruption line 17. When this signal is accepted by the unit 12, the linkage information stored in the program counters 22, 23, PSW register 27 and resident RAM array 28, that is, the linkage information corresponding to the job 1 which has been processed by the unit 12, is transferred to the SP 1 area, PC 1 area, PSW 1 area and fixed memory area 1. This information is transmitted to the program counters 22, 23, PSW register 27 and resident RAM array 28 of the unit 11 through the memory 13 and in this unit 11 job 1 is again executed. Further, that linkage information corresponding to the job 2 inherent in the unit 12 which has been stored in the SP 2 area, PC 2 area, PSW 2 area and fixed memory area 2 is sent back to the unit 12, whereby the job 2 is again executed in the unit 12.

When in the above-mentioned manner the preferential job has been issued from the I/O device 14 connected to the unit 11 into the processor unit 11, an interruption signal is sent to the unit 12 from the unit 11 through the interruption line to cause the job 2 executed in the unit 12 to be transferred to the memory 13 and also to cause the job 1 executed in the unit 11 to be transferred to the unit 12 through the memory 13. In this way, the job 2 processed in the unit 12 is temporarily stored in the memory 13; in the unit 12 the job 1 previously executed in the unit 11 is executed; and in the unit 11 the job 0 supplied from the I/O device 14 is executed. When the job 0 has been processed, the jobs 1 and 2 are sent back to the units 11 and 12, respectively, and are processed therein, respectively.

According to the multi-processor system, a smooth transfer of the linkage information between the processor units is carried out which results in an efficient operation of the system.

In the above-mentioned embodiment, transfer of the jobs is effected by external interruption as from the I/O device, but job transfer can be also effected by an interruption issued from the operating system in the processor unit.

Further, where a preferential job has occurred in the I/O device connected to the second processor unit 12, the job which has theretofore been executed in this unit 12 is transferred to the memory, whereby the preferential job from the I/O device is executed in the unit 12. In this case, an interruption request is transmitted from the processor unit 12 to the processor unit 11.

What we claim is:

1. A multi-processor system coupled to an external I/O device, said multi-processor system comprising:
    (a) an external memory;
    (b) a high priority processor initially executing a first stored program and connected by a data bus to said external memory, said high priority processor including:
        (i) a first internal memory containing linkage information, including program status data and instructions, for the program being executed by said high priority processor,
        (ii) first program control means coupled to said first internal memory for directing the transfer of said linkage information between said first internal memory and said external memory via said data bus,
        (iii) an instruction register and decoder which receives an interrupt signal from said I/O device and which causes said program control means to direct the transfer of said linkage information corresponding to said first stored program into said external memory, and
        (iv) means coupled to said instruction register and decoder for generating a swap interrupt signal after said linkage information is stored in said external memory and for causing said high priority processor to execute a program supplied by said I/O device; and
    (c) a low priority processor initially executing a second stored program and connected by said data bus to said external memory, said low priority processor including:
        (i) a second internal memory containing linkage information, including program status data and instructions, for the program being executed by said low priority processor,
        (ii) second program control means coupled to said second internal memory for directing the transfer of said linkage information between said second internal memory and said external memory via said data bus,
        (iii) a control and timing circuit responsive to said swap interrupt signal from said high priority processor for causing said second program control means to direct the storage of said linkage information corresponding to said second stored programming into said external memory and to direct the retrieval of said linkage information corresponding to said first stored program from said external memory into said second internal memory of said low priority processor, thereby causing said low priority processor to execute said first stored program.

2. The multi-processor system in claim 1 wherein said control and timing circuit, upon receiving said swap interrupt signal when said low priority processor is executing said first stored program, also causes said second program control means to direct the storage of said linkage information corresponding to said first stored program into said external memory and to direct the retrieval of said linkage information corresponding to said second stored program from said external memory into said second internal memory of said low priority processor;
and
wherein said first program control means of said high priority processor also includes means for directing the retrieval of said linkage information corresponding to said first stored program from said external memory into said first internal memory of said high priority processor.

3. In a multi-processor system including an external memory, a high priority processor executing a first program, a low priority processor executing a second program, and an I/O device connected to said high priority processor, a method of controlling which programs are executed by said processors comprising the steps of:

(a) receiving an interrupt from said I/O device in an instruction register and decoder in said high priority processor;

(b) storing linkage information, including program status data and instructions, for said first program into said external memory in response to signals from said instruction register and decoder;

(c) sending a swap interrupt signal from said high priority processor to said low priority processor;

(d) executing a program supplied by said I/O device in said high priority processor;

(e) transferring linkage information for said second program, including program status data and instructions, from said second internal memory to said external memory upon receipt of said swap interrupt signal by a control and timing circuit in said low priority processor;

(f) transferring said linkage information for said first program from said external memory to said low priority processor in response to signals from said control and timing circuit;

(g) executing said first program in said low priority processor;

(h) sending said swap interrupt signal from said high priority processor to said control and timing circuit in said low priority processor when said high priority processor has completed executing said program for said I/O device;

(i) transferring said first program linkage information from said low priority processor to said external memory upon the receipt of said swap interrupt signal by said control and timing circuit;

(j) transferring said linkage information for said second program from said external memory to said low priority processor;

(k) transferring said linkage information for said first program from said external memory to said high priority processor;

(l) executing said second program in said low priority processor; and (m) executing said first program in said high priority processor.

* * * * *